(12) United States Patent
Gomez Rabago

(10) Patent No.: US 11,898,038 B2
(45) Date of Patent: Feb. 13, 2024

(54) ADDITIVE TO IMPROVE THE PROCESSABILITY IN THE MANUFACTURE OF ETHYLENE, PROPYLENE AND DIENE COMPOUNDS AND A METHOD TO PRODUCE THEREOF

(71) Applicant: CHEMICAL & SCHUTZ HIGH PERFORMANCE LUBRICANTS, S.A. DE C.V., Aguascalientes (MX)

(72) Inventor: Bernardo Gomez Rabago, Aguascalientes (MX)

(73) Assignee: Chemical & Schutz High Performance Lubricants, S.A. de C.V., Aguascalientes (MX)

( * ) Notice: Subject to any disclaimer, the term of this patent is extended or adjusted under 35 U.S.C. 154(b) by 308 days.

(21) Appl. No.: 17/205,478

(22) Filed: Mar. 18, 2021

(65) Prior Publication Data
US 2021/0292562 A1 Sep. 23, 2021

(30) Foreign Application Priority Data
Mar. 19, 2020 (MX) ............... MX/a/2020/003065

(51) Int. Cl.
C08L 91/00 (2006.01)

(52) U.S. Cl.
CPC ........... *C08L 91/00* (2013.01); *C08L 2205/06* (2013.01); *C08L 2207/322* (2013.01)

(58) Field of Classification Search
CPC ...... C08L 91/00; C08L 23/16; C08L 2205/06; C08L 2207/322
See application file for complete search history.

(56) References Cited

U.S. PATENT DOCUMENTS

| | | | |
|---|---|---|---|
| 4,224,196 A * | 9/1980 | Gursky | .................... C08K 5/09 525/215 |
| 4,645,793 A | 2/1987 | Von Hellens et al. | |
| 8,901,191 B2 | 12/2014 | Molnar et al. | |
| 8,962,724 B2 | 2/2015 | Molnar et al. | |

FOREIGN PATENT DOCUMENTS

| | | |
|---|---|---|
| CA | 2 205 953 | 5/1996 |
| WO | 03/020806 | 3/2003 |
| WO | 2018097982 | 5/2018 |

OTHER PUBLICATIONS

ECL a Quaker Chemical Company, "Choosing a Grease for your Design", Quick-Study for Product Design Engineers https://www.ecllube.com/resources-for-engineers/tutorials/ECL_Choosing%20a%20Grease.pdf.

Reincke, et al., "Influence of Process Oils on the Mechanical Properties of Elastomers", Prüfen Und Messen Testing and Measuring, KGK, Oct. 2009, pp. 506-514.

* cited by examiner

Primary Examiner — Angela C Scott
(74) Attorney, Agent, or Firm — Hamre, Schumann, Mueller & Larson, P.C.

(57) ABSTRACT

The present invention relates to an additive to improve processability in the manufacture of ethylene, propylene and diene compounds, comprising Ethylene Propylene Diene type M (EPDM) and paraffinic mineral oil, and a method for producing additive to improve processability in the manufacture of ethylene, propylene and diene compounds, comprising the steps of: a) heating one fifth of paraffinic mineral oil until reaching a temperature of 100° C.±5° C.; b) once the paraffinic mineral oil portion reaches the indicated temperature, add Ethylene Propylene Diene type M (EPDM), maintaining constant temperature and stirring until complete dissolution to generate Mixture 1; c) Add the remaining four fifths of the paraffinic mineral oil to Mix 1 and continue stirring until dissolution is complete while maintaining the temperature; and d) once complete integration of Blend 1 and the remaining four fifths of the paraffinic mineral oil is achieved, filtering the additive to remove any remnants and/or impurities.

18 Claims, 1 Drawing Sheet

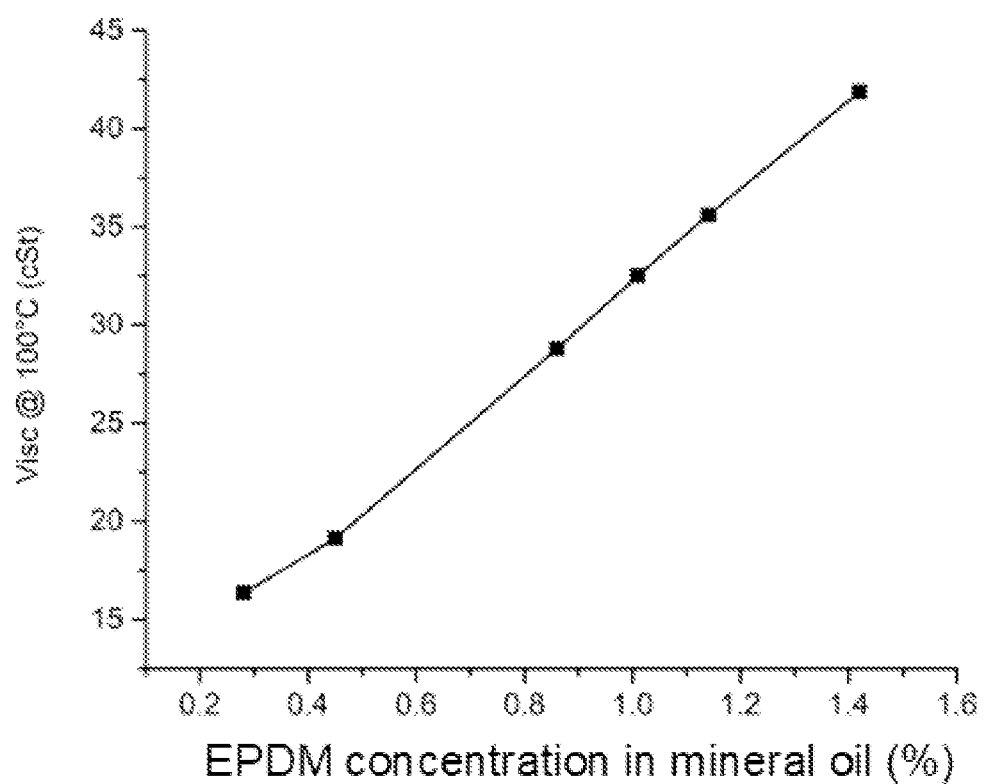

ADDITIVE TO IMPROVE THE PROCESSABILITY IN THE MANUFACTURE OF ETHYLENE, PROPYLENE AND DIENE COMPOUNDS AND A METHOD TO PRODUCE THEREOF

FIELD OF THE INVENTION

The present invention relates to the production of additives to improve the processability of polymeric products, and more particularly to an additive to improve the processability in the manufacture of ethylene, propylene and diene compounds, and a method for producing thereof.

BACKGROUND OF THE INVENTION

In the processing of polymeric products, particularly in the production of ethylene, propylene and diene compounds, for example, automotive profiles, hoses, grommets (seals), cable glands, high-temperature bearing caps, etc., many problems are currently encountered to be associated with the processability of said polymeric products due to their Physicochemical properties.

The most frequently associated problems are that the ethylene, propylene and diene compounds obtained have lower mechanical properties (hardness, compression, elastic recovery, etc.). The associated cost is higher in process oils with lower product quality. Mooney viscosity in rubber compounds is vital, so control of this is poor. The poor natural resistance to oxidation, which is why staining is generated in EPDM compounds.

The present invention is directed to an additive to improve the processability of polymeric products, particularly the manufacture of ethylene, propylene and diene compounds, wherein the additive comprises Ethylene Propylene Diene type M (EPDM), as well as mineral oil, particularly paraffinic mineral oil, which is marketed as SN 600 GII.

Within the scope of the present invention, the used EPDM is marketed under the brand name Royalene® and is selected from the varieties of Royalene® 301T, Royalene® 360, Royalene® 400, Royalene® 4191 P, Royalene® 4191P-1, Royalene® 3445, Royalene® 4345F, Royalene® 500, Royalene® 575, Royalene® 580-HT, Royalene® 511 and Royalene® 512.

Preferably, the used EPDM is Royalene®512, which comprises 65.3% ethylene, 30.8% propylene and 3.9% diene, specific gravity of 0.87, Mooney viscosity of 57 @ 120° C.

In this sense, the mineral oil, particularly paraffinic mineral oil, is selected from SN 600 GI, SN 600 GII and SN 850, preferably the used paraffinic mineral oil is SN 600 GII.

In a first embodiment, EPDM is found in different weight concentration ranges in paraffinic mineral oil, as a first embodiment, EPDM is in a range of 0.4% to 1.3% by weight and paraffinic mineral oil is present in a range from 99.6% to 98.7% by weight.

In a second embodiment, EPDM is found in different weight concentrations in paraffinic mineral oil, as a first embodiment, EPDM is 0.86% by weight and SN 600 GI is present at 99.14% by weight.

In a third embodiment, EPDM is 1% by weight and SN 600 GII is present at 99% by weight.

In a fourth embodiment, EPDM is 0.7% by weight and SN 850 is 99.3% by weight.

In a fifth embodiment, EPDM is 0.95% by weight and SN 600 GII in combination with SN 850 is 99.05% by weight.

The additive to improve the processability of polymeric products provides greater processing when used as a plasticizer in polymeric EPDM compounds. In addition to this improvement in processability, a much more stable vulcanization speed is generated, and this is impacted on the mechanical properties of the rubber compound such as: compressibility, elastic recovery and hardness.

Another outstanding advantage of using the additive to improve the processability of polymeric products is the reduction of product cost of the process oil and, therefore, cost reduction in the manufacturing process of EPDM polymeric compounds.

BRIEF DESCRIPTION OF THE FIGURES

To give a better understanding of the invention, a description of the same is provided below, together with the accompanying FIGURE, in which:

FIG. 1 shows the effect on viscosity when increasing the concentration of EPDM in SN 600 GI.

DETAILED DESCRIPTION

The additive to improve the processability of polymeric products is produced by heating one fifth of the paraffinic mineral oil to a temperature of 100° C.±5° C.

Once the portion of the paraffinic mineral oil reaches the indicated temperature, the EPDM is added, maintaining a constant temperature and stirring until its complete dissolution, the time range varies by approximately 36 hours and the stirring varies by approximately 500 RPM, thereby which produces a first mix, hereinafter, "Mix 1".

In the next step, the remaining four fifths of the paraffinic mineral oil is added to Mix 1, and stirring is continued until dissolution is complete, while maintaining the temperature at 100° C.±5° C.

Once a complete integration of Mix 1 and the remaining four fifths of the paraffinic mineral oil is achieved, the additive is filtered to improve the processability of polymeric products to eliminate any remnants and/or impurities that it may have.

In this sense, the mineral oil, particularly paraffinic mineral oil, is selected SN 600 GI, SN 600 GII, SN 850 or mixtures thereof, preferably the paraffinic mineral oil used is SN 600 GII.

The additive to improve the processability of polymeric products comprises the following specifications shown in the following Tables 1 to 4:

TABLE 1

| No. | Test Name | Method | Units | Specification | MAC 140-33-310 GII (Mineral paraffin oil SN 600 GII) |
|---|---|---|---|---|---|
| 1 | Kinematic viscosity at 40° C. | ASTM D-445/ ASTM D-7042 | mm$^2$/s (cSt) | Report | 378.8 |
| 2 | Kinematic viscosity at 100° C. | ASTM D-445/ ASTM D-7042 | mm$^2$/s (cSt) | 30-36 | 35.92 |
| 3 | Relative Density at 15.6° C. | ASTM D-1298 | AD | Report | 0.8735 |
| 4 | Humidity | INC-CCA-07 | AD | Negative | Negative |
| 5 | ASTM Color | ASTM D-1500 | AD | Report | 0.5 |
| 6 | Aromatic Content | ASTM D-2140 | % | 2.5 max | 0 |

TABLE 2

| No. | Test Name | Method | Units | Specification | MAC 140-30-310 (Paraffinic mineral oil SN 600 GI) |
|---|---|---|---|---|---|
| 1 | Relative density at 15.6° C. | ASTM D-1298 | AD | REPORT | 0.877 |
| 2 | Kinematic viscosity at 40° C. | ASTM D-445 | mm$^2$/s (cSt) | REPORT | 324.5 |
| 3 | Kinematic viscosity at 100° C. | ASTM D-445 | mm$^2$/s (cSt) | 28.5-34.5 | 31.36 |
| 5 | Humidity | INC-CCA-07 | AD | Negative | Negative |
| 6 | ASTM Color | ASTM D-1500 | AD | Report | L 1.5 |

TABLE 3

| No. | Test Name | Method | Units | Specification | MAC 140-33-480 (Mineral paraffin oil SN 850) TYPICAL VALUES |
|---|---|---|---|---|---|
| 1 | Relative density at 15.6° C. | ASTM D-1298 | AD | Typical | 0.9071 |
| 2 | Kinematic viscosity at 100° C. | ASTM D-445 | mm$^2$/s (cSt) | 30-36 | 33.55 |
| 3 | Kinematic viscosity at 100° C. | ASTM D-445 | mm$^2$/s (cSt) | Typical | 426.9 |
| 4 | ASTM Color | ASTM D-1500 | AD | Report | L 3.0 |
| 5 | Humidity | INC-CCA-07 | AD | Negative | Negative |
| 6 | Aromatic Content | ASTM D-2140 | % | 2.5 max | 1 |

TABLE 4

| No. | Test Name | Method | Units | Specification | MAC 140-33-ADVANCE (Paraffinic mineral oil SN 600 GII in combination with SN 850) |
|---|---|---|---|---|---|
| 1 | Density at 15.6° C. | ASTM D-1298 | AD | Report | 0.8853 |
| 2 | Kinematic viscosity at 100° C. | ASTM D-445 | mm$^2$/s (cSt) | 30-36 (33.00 Typical) | 33.85 |
| 3 | Kinematic viscosity at 40° C. | ASTM D-445 | mm$^2$/s (cSt) | Report | 378.1 |
| 4 | ASTM Color | ASTM D-1500 | AD | Report | 1.5 |
| 5 | Aromatic carbons | ASTM D-2140 | % | 2.5 maximum | 1 |
| 6 | Paraffinic carbons | ASTM D-2140 | % | Report | 78 |
| 7 | Naphthenic carbons | ASTM D-2140 | % | Report | 21 |
| 8 | Humidity | INC-CCA-07 | AD | Negative | Negative |

In this sense, in FIG. 1, the effect of increasing the viscosity in the additive is shown when the concentration of EPDM is increased in the paraffinic mineral oil, which is vital in the processability of the manufacture of ethylene and propylene compounds and diene, so for every 0.3% of EPDM, the increase in viscosity increases by approximately 7 cSt.

The present invention has been described in its preferred embodiment; however, it will be apparent to those skilled in the art that a multiplicity of changes and modifications can be made to this invention, without departing from the scope of the following claims.

The invention claimed is:

1. An additive to improve processability in the manufacture of ethylene, propylene and diene compounds, comprising:
    ethylene propylene diene type M (EPDM) in a range from 0.4% to 1.3% by weight and
    paraffinic mineral oil in a range of 99.6% to 98.7% by weight.

2. The additive to improve processability in the manufacture of ethylene, propylene and diene compounds according to claim 1, wherein the EPDM comprises ethylene, 30.8% propylene, and 3.9% diene.

3. The additive to improve processability in the manufacture of ethylene, propylene and diene compounds according to claim 1, wherein the paraffinic mineral oil is selected from SN 600 GI, SN 600 GiI, SN 850, or mixtures thereof.

4. The additive to improve processability in the manufacture of ethylene, propylene and diene compounds according to claim 3, wherein the EPDM is 1% by weight and the SN 600 GII is present in 99% by weight.

5. The additive for improving processability in the manufacture of ethylene, propylene and diene compounds according to claim 4, wherein the additive has a kinematic viscosity of 114.4 cSt at 40° C.

6. The additive for improving processability in the manufacture of ethylene, propylene and diene compounds according to claim 4, wherein the additive has a kinematic viscosity of 33 cSt at 100° C.

7. The additive for improving the processability in the manufacture of ethylene, propylene and diene compounds according to claim 4, wherein the additive is free of aromatic components.

8. The additive to improve processability in the manufacture of ethylene, propylene and diene compounds according to claim 3, wherein the EPDM is by weight and the SN 600 GI is present at 99.14% by weight.

9. The additive for improving processability in the manufacture of ethylene, propylene and diene compounds according to claim 8, wherein the additive has a kinematic viscosity of 426.9 cSt at 40° C.

10. The additive for improving processability in the manufacture of ethylene, propylene and diene compounds according to claim 8, wherein the additive has a kinematic viscosity of 33.55 cSt at 100° C.

11. The additive to improve processability in the manufacture of ethylene, propylene and diene compounds according to claim 3, wherein the EPDM is 0.7% by weight and the SN 850 is 99.3% by weight.

12. The additive to improve processability in the manufacture of ethylene, propylene and diene compounds according to claim 3, wherein the EPDM is by weight and the SN 600 GII in combination with the SN 850 is 99.05% by weight.

13. The additive for improving processability in the manufacture of ethylene, propylene and diene compounds according to claim 12, wherein the additive has a kinematic viscosity of 361.3 cSt at 40° C.

14. The additive for improving processability in the manufacture of ethylene, propylene and diene compounds according to claim 12, wherein the additive has a kinematic viscosity of 33.73 cSt at 100° C.

15. A method for producing the additive of claim 1, comprising:
    heating one fifth of the paraffinic mineral oil to a temperature of 100° C.±5° C.;
    once the one fifth of the paraffinic mineral oil portion reaches said temperature, adding the ethylene propylene diene type M (EPDM), and maintaining a constant temperature and stirring until completely dissolved to generate a first mixture;
    adding the remaining four fifths of the paraffinic mineral oil to the first mixture and continue stirring until dissolution is complete while maintaining the temperature; and
    once complete integration of the first mixture and the remaining four fifths of the paraffinic mineral oil is achieved, filtering the additive to remove any remnants and/or impurities.

16. The method according to claim 15, wherein the paraffinic mineral oil is selected from SN 600 GI, SN 600 GII, SN 850, or mixtures thereof.

17. The method according to claim 16, wherein the paraffinic mineral oil is the SN 600 GII.

18. The method according to claim 15, wherein the stirring varies by about 500 RPM.

* * * * *